(12) United States Patent
Krein (10) Patent No.: US 7,030,512 B2
(45) Date of Patent: Apr. 18, 2006

(54) DYNAMIC CURRENT SHARING DC-DC SWITCHING POWER SUPPLY

(75) Inventor: Philip T. Krein, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 28 days.

(21) Appl. No.: 10/877,514

(22) Filed: Jun. 25, 2004

(65) Prior Publication Data

US 2005/0286277 A1   Dec. 29, 2005

(51) Int. Cl.
*H02J 1/00* (2006.01)

(52) U.S. Cl. ............................ 307/77; 307/61; 307/63; 363/65

(58) Field of Classification Search .................. 307/43, 307/52, 54, 58, 60, 61, 63, 77, 82, 83; 363/65, 363/71; 32/268, 271, 272
See application file for complete search history.

(56) References Cited

U.S. PATENT DOCUMENTS

| | | | | |
|---|---|---|---|---|
| 5,768,117 | A * | 6/1998 | Takahashi et al. ............ | 363/65 |
| 6,370,047 | B1 * | 4/2002 | Mallory ........................ | 363/65 |
| 6,388,904 | B1 * | 5/2002 | Nomura ....................... | 363/71 |
| 6,917,527 | B1 * | 7/2005 | Takada ......................... | 363/16 |

OTHER PUBLICATIONS

Leo F. Casey and Martin F. Schlecht, "A High-Frequency, Low Volume, Point-of-Load Power Supply for Distributed Power Systems", IEEE Transactions on Power Electronics, vol. 3, No. 1, Jan. 1988, pp. 72-82.

P. Zumel, O. Garcia, J.A. Cobos, J. Uceda, "Magnetic Integration for Interleaved Converters", Proc. IEEE Applied Power Electronics Conf., 2003, pp. 1143-1149.

R. Miftakhutdinov, "Optimal Design of Interleaved Synchronous Buck Converter at High Slew-Rate Load Current Transients", Rec. IEEE Power Electronics Specialists Conf., 2001, pp. 1714-1718.

J.R. Pinheiro, J.E. Baggio, "Isolated Interleaved-Phase-Shift-PWM dc-dc ZVS Converters", Rec. IEEE Industry Applications Society Ann. Meet., 2000, pp. 2383-2388.

(Continued)

*Primary Examiner*—Gary L Laxton (57) ABSTRACT

A power supply in an embodiment of the invention includes a plurality of dc—dc switching power converters, each of which has its input isolated from its output. The power converters are arranged with their respective inputs being series connected and their respective outputs being parallel connected in an embodiment of the invention. In another embodiment of the inputs are parallel connected and the outputs series connected. Each power converter includes an input filter in each of said dc—dc switching power converters and an output filter. Each power converter includes a sensorless current mode control circuit controlling its switching duty ratio.

27 Claims, 8 Drawing Sheets

OTHER PUBLICATIONS

A. Bhinge, N. Mohan, R. Giri, R. Ayyanar, "Series-Parallel Connection of DC-DC Converter Modules with Active Sharing of Input Voltage and Load Current", Proc. IEEE Applied Power Electronics Conf., 2002, pp. 648-653.

R. Giri, R. Ayyanar, N. Mohan, "Common Duty Ratio Control of Input Series Connected Modular DC-DC Converters with Active Input Voltage and Load Current Sharing", Proc. IEEE Applied Power Electronics Conf., 2003, pp. 332-326.

P. Midya, P.T. Krein, M.F. Greuel, "Sensorless Current Mode Control—An Observer-Based Technique for DC-DC Converters", IEEE Transactions on Power Electronics, vol. 16, No. 4, Jul., 2001, pp. 522-526.

P.T. Krein, P. Midya, U. Ekambaram, "A Distributed Low-Voltage Power Converter", Publication UILU-ENG-93-2563, 1993.

* cited by examiner

DYNAMIC CURRENT SHARING DC-DC SWITCHING POWER SUPPLY

FIELD OF THE INVENTION

The invention concerns switching power supplies. A power supply based on the invention may be used, for example, as a voltage regulation module, to step down voltage from a high voltage power source to a circuit or device, e.g., a microprocessor, or to step up voltage from a low voltage source, e.g., a fuel cell, to a load.

BACKGROUND OF THE INVENTION

Modern digital electronic circuits rely upon the delivery of significant currents to achieve required power for operation, as the trend has been toward lower voltages. This presents a dilemma in circuit design. Delivering high current loads, e.g., hundreds of amps, to printed circuit boards and integrated circuit devices can raise the cost of circuits. High current buses add significant expense to circuits and devices, but are generally necessary to deliver high current to printed circuit boards.

Modern microprocessors highlight the trend toward delivery of high current loads. The Pentium® II processor, introduced in the late 1990s, marked the trend toward requiring high current at low voltage. This has continued through the Pentium® line of processors. Switching power supplies of a category now termed "voltage regulator modules," first introduced in the 1980s, became popular with this generation of processors and their high current at low voltage demands. Commercial voltage regulator modules used with these types of processors use parallel conversion circuits and seek to enforce current sharing among the parallel converters through actively monitored controls. A typical Pentium® IV processor uses four converters to deliver less than 2 V, from either a 5V or 12V source. Future generations of processors are likely to require hundreds of amps at voltages as low as 1V or lower. Server applications often make use of even higher source voltages, e.g., 48V. For extreme voltage conversion ratios, such as 48 V to 1 V, two-stage conversion processes have become conventional. In these cases, a one-stage conversion would be preferable to a two-stage conversion, as power losses and other problems are exacerbated by multi-stage conversion.

The switch operation in conventional parallel converters is normally interleaved. The main switches in n converters are spaced in phase by 1/n of each cycle. This reduces output voltage ripple by a factor of n relative to each converter and provides some dynamic advantages. Success in this scheme requires current sharing among the parallel converters, as imperfect current sharing can result in the overloading of an individual converter. This difficulty has been an active subject of research, with the active monitoring and control mentioned above being explored extensively. Despite the research, there remains a need for a converter that supports current sharing, one-stage conversion and performs well during fast transients.

SUMMARY OF THE INVENTION

A power supply in an embodiment of the invention includes a plurality of dc—dc switching power converters, each of which has its input isolated or switchably isolated from its output. The power converters are arranged with their respective inputs being series connected and their respective outputs being parallel connected in an embodiment of the invention. In another embodiment of the inputs are parallel connected and the outputs series connected. Each power converter includes an input filter in each of said dc—dc switching power converters and an output filter. Each power converter includes a sensorless current mode control circuit controlling its switching duty ratio.

DETAILED DESCRIPTION OF THE PREFERRED EMBODIMENTS

In preferred power supply embodiments of the invention, dc—dc switching converters make a substantial step up or step down in voltage while enforcing a sensorless current mode control that regulates output voltage and provides good dynamic current sharing. A preferred application of a step down embodiment of the invention is as a voltage regulator module that steps down a high voltage from a power source to a low voltage for a microprocessor. Good dynamic response may be realized, to potentially reduce the number of necessary filter capacitors, which are often used in conventional voltage regulator modules as a compromise for the poor dynamic response of current controlled voltage regulator modules that use a sensor to determine the voltage across an inductor serving as an output filter. A typical conventional arrangement is configured in multiple stages of parallel-input, parallel-output converters, and capacitors are used on the parallel-output to improve dynamic response.

Sensorless current mode control has been applied to control a parallel-input parallel-output converter. See, Krein et al., "Sensorless Current Mode Control," IEEE Trans. Power Electronics, vol. 16, no. 4, pp. 522–26 (Jul. 2001). In sensorless current mode control, the current through an inductor within a power converter is not measured directly. Instead, the voltage across the inductor is integrated with respect to a reference. When an output inductor is used in this process, the integration is with respect to a reference, e.g., the ideal output voltage. The integration is used to control the switching duty ratio. The present invention provides power supplies that use sensorless current mode control in series-input parallel-output or series-output parallel-input arrangements that can provide substantial stepped up or stepped down voltage output. Sensorless current mode controllers in a plurality of connected dc—dc switching converters use reference values for output voltage and for input voltage. Some specific embodiments will now be discussed.

Figure 1:
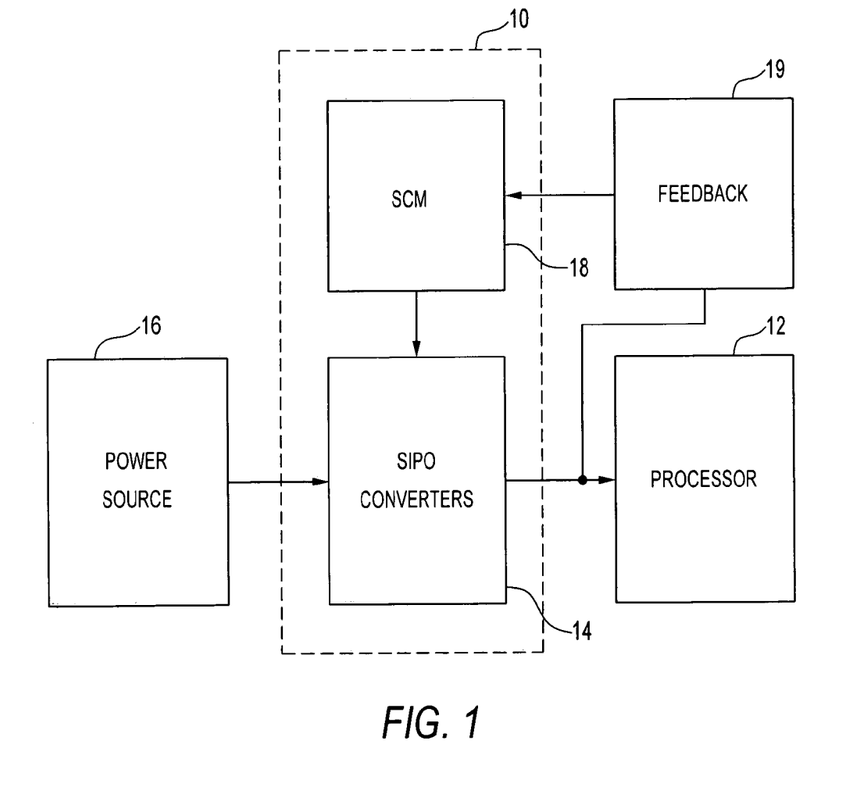
FIG. 1 is a block diagram of a processor system including a dc—dc switching power supply in accordance with an embodiment of the invention.

FIG. 1 shows an example processor system including a dc—dc switching power source 10 in accordance with the invention. The dc—dc switching power source 10 provides power to a processor 12, e.g., such as a processor requiring hundreds of amps at voltages as low as 2V, 1V, or lower. A dc—dc switching power source 10 is a single stage converter performing a voltage step down, such as by a step down achieved with magnetically coupled windings, in a plurality of series-input parallel-output switching power converters 14. Switching power converter duty ratios also can be selected to achieve specific output voltage values. The converters 14 step down voltage from a power source 16, for example, a high voltage dc power supply. The duty ratio of switching in the converter 14 is controlled by a sensorless current mode controller 18. In each of the converters controlled by sensorless current mode control, the input of the individual converter is isolated from the output of the individual converter. One type of isolation is a magnetic coupling realized through windings. Another type of isolation is through a set of complementary switches that switchably isolate. Yet another type of isolation is a diode connection that switchably isolates the input and output of individual converters of the series-input parallel-output converters 14. While the general case contemplated in the embodiment of FIG. 1 concerns a step down voltage scenario, other embodiments of the invention may be implemented to a step up voltage. The reference output voltage used by the sensorless current mode controller 18 may be updated, for example periodically, by a feedback circuit 19. The feedback circuit 19 monitors the actual voltage output to the processor 12, and that value is used to adjust or replaced the reference output voltage value used by the sensorless current mode controller 18. Other embodiments may include different feedback and correction mechanisms. In an other embodiment, the feedback circuit 19 compares actual output voltage to the ideal output to determine a difference voltage and uses the difference voltage to correct the actual output voltage.

Figure 2:
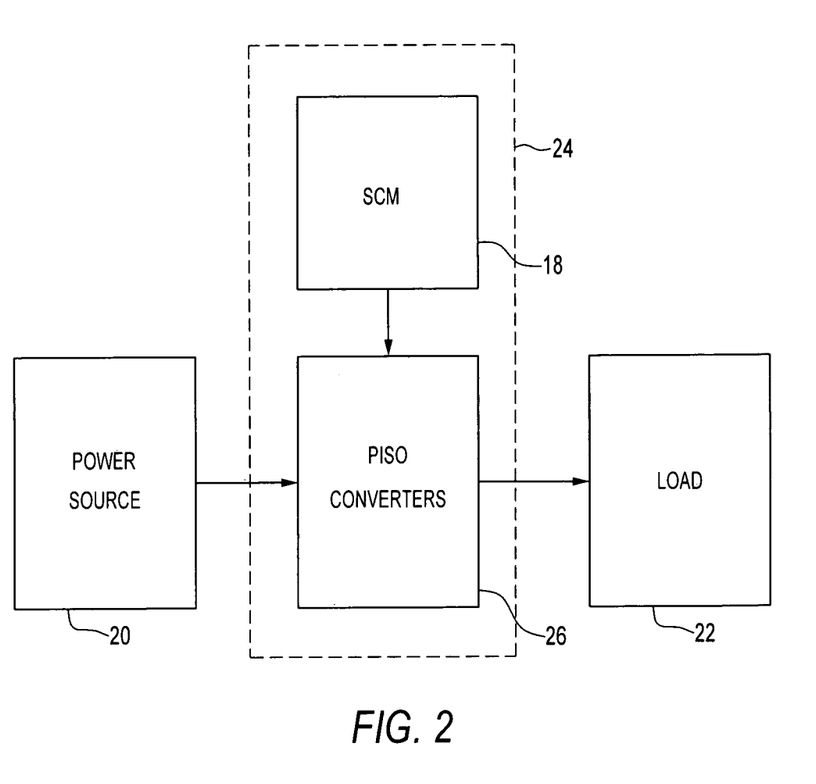
FIG. 2 is a block diagram of a processor system including a dc—dc switching power supply in accordance with another embodiment of the invention.

FIG. 2 shows an exemplary system to deliver power from a power source 20 to a load 22 through a switching power supply 24 in accordance with another embodiment of the invention. The switching power supply 24 includes a set of parallel-input series-output converters 26 that have the duty switching duty ratios controlled by sensorless current mode control 18. The power source 20, for example, may be a plurality of low voltage power cells, such as fuel cells. The power source 20 may be a low voltage source and the switching power supply 24 may step up the voltage, which is achieved with the single stage parallel-input series-output converters.

As the converters used in embodiments of the invention may include a magnetic coupling that can account for a step up or step down voltage, either of the series-input parallel-output (SIPO) or parallel-input series-output (PISO) converter configurations may be used to step up or step down voltage from a power source to a load. Thus, for example, an alternate embodiment for FIG. 1 includes PISO converters and an alternate embodiment for FIG. 2 includes SIPO converters.

Figure 3:
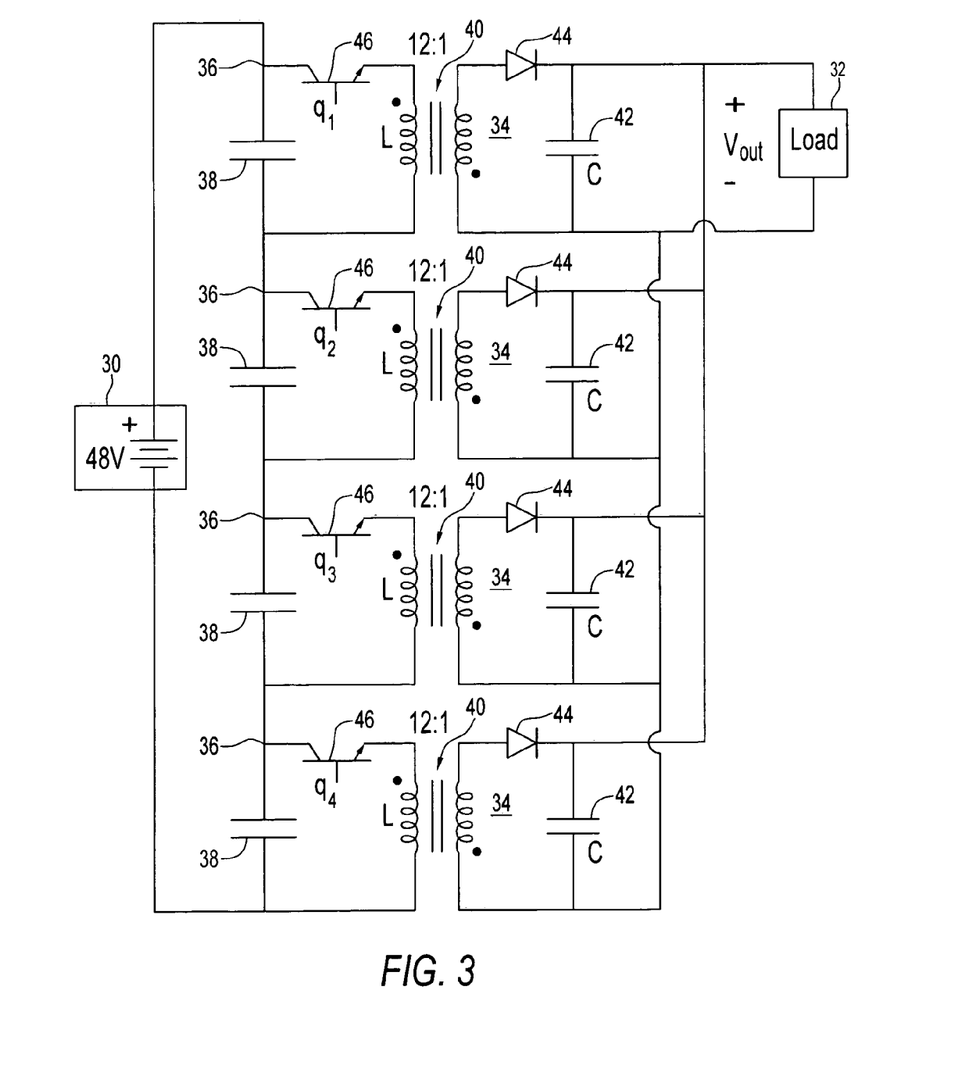
FIG. 3 illustrates an SIPO (series-input parallel-output) dc—dc switching power supply in accordance with an embodiment of the invention.

FIG. 3 illustrates an example embodiment for stepping down an example 48 volt voltage from a power source 30 to one volt for a load 32. Four switching power converters 34 are flyback power converters arranged with respective inputs 36 in series. The inputs 36 include capacitors 38 as input filters. Each of the power converters 34 in the example of FIG. 3 includes a magnetic coupling 40 that achieves a 12:1 voltage step down to produce a parallel-output of one volt to the load 32. The flyback converters 34 include an output capacitor 42 and a diode 44, which prevents reverse current flow. The duty ratio in each converter 34 is controlled by a switch 46 that receives a signal $q_n$ produced by the sensorless current load controller. The series-input sensorless current mode control of FIG. 3 supports extreme voltage ratios and provides automatic current sharing among the converters.

On the input side of the converters 34, the input capacitors 38 provide short term ac current for converter operation. Unless the capacitors 38 are very large, the ac input side currents will also be identical. The ac input side currents will differ only at the switching frequency, at which the invention will insure high ripple frequency and low output ripple. When the transformer turns in the magnetic couplers 40 of the power converters 34 match in FIG. 3, the output currents will also match. Within the limits of manufacturing tolerances, nearly ideal output current sharing is provided simply by using the same transformers in each converter. The sensorless current mode control provided to the switches 46 as a signal $q_n$ provides stability to address the case in which one converter is perturbed to see a slightly lower input voltage. Without appropriate control, the input current would increase as the one converter would attempt to keep supplying the load, thus removing energy from its input capacitance and further reducing its input voltage. Without the sensorless current mode control, the end result is the converters will not share the load.

Sensorless current mode control reconstructs a signal equivalent to the converter current by integrating the voltage, in the case of FIG. 3, the voltage across the transformer 40, and then controlling the converter 34 by comparing the integrated signal to a carrier ramp waveform. In the flyback converter of FIG. 3, the input voltage for the converter 34 is given by $q_1 V_{in'} - q'_1 V_{out'}$, where $V_{in'}$ is the individual output voltage of a converter 34 and $V_{out'}$ is a scaled output voltage to account for the turns ratio of the converter 34. The signals $q_1$ and $q'_1$ represent the transistor and diode switching functions for the top converter in FIG. 3. In accordance with sensorless current mode control, it is recognized that $V_{out}$ is not intended to be a dynamic state, and is instead intended to be driven to a desired reference value. Therefore, an external reference signal is substituted for $V_{out}$. We consider in addition that the individual converter voltage $V_{in'}$ is intended to be $V_{in}/n$, where n is the number of converters. In FIG. 3, n equals 4. Using these substitutions, the transformer voltage is presumed to be $q_1 V_{in}/n - q'_1 V_{ref}$. In additional embodiments, $V_{ref}$ may be modified to include an output feedback term to correct for errors.

Figure 4A:
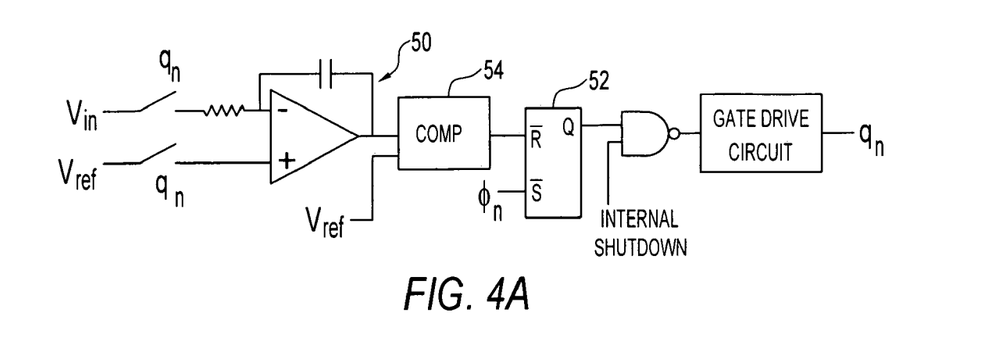
FIG. 4A illustrates an example sensorless current mode controller for use in dc—dc switching power supply in accordance with embodiments of the invention.
Figure 4B:
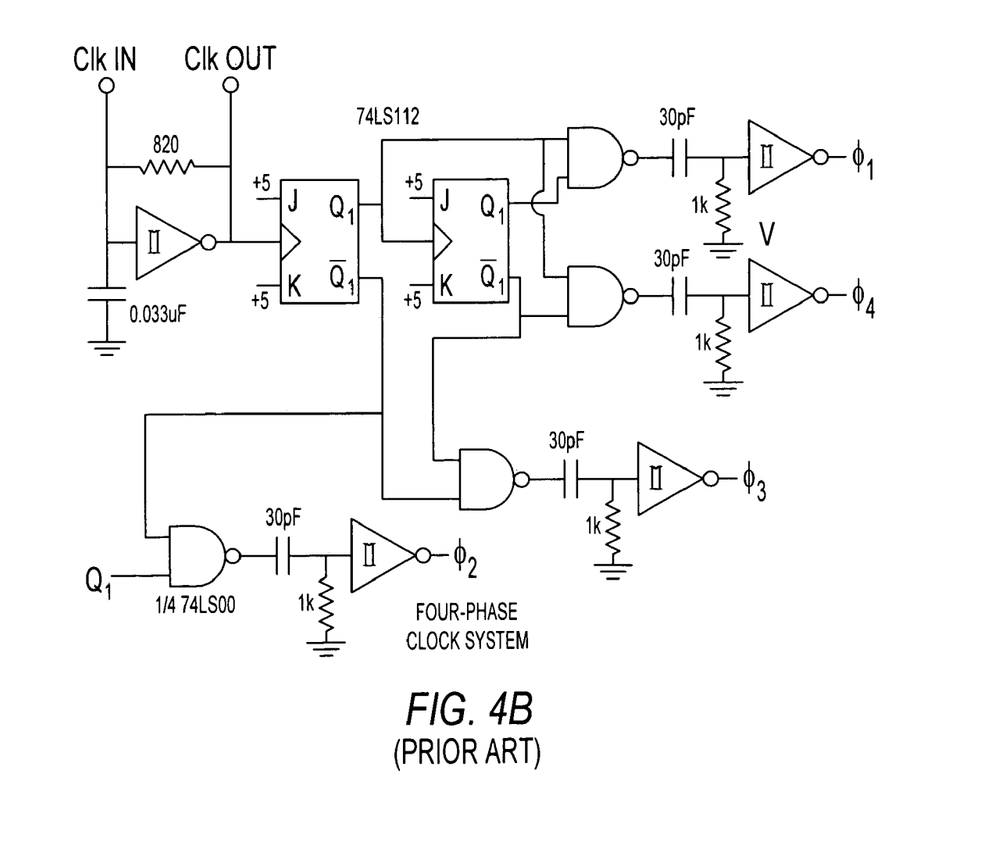
FIG. 4B (prior art) illustrates an example embodiment n-phase clock system for use with an n-converter dc—dc switching power supply according to embodiments of the invention.

FIG. 4A shows an example sensorless current mode controller to provide a signal $Q_n$ for controlling switching, such as the switching for the converters 34 shown in FIG. 3. In FIG. 4A, an op amp 50 performs integration for one of the converters 34. An n phase clock sets a latch 52 and a comparator 54 resets the latch 52. The comparator 54 compares the integrated signal and reference signal, such as a periodic reference ramp signal or a constant reference signal. A driver 56 provides a signal to the gate of the switch 46 in FIG. 3. FIG. 4B shows a conventional four phase clock system that could be used with the sensorless current mode controller supplied to FIG. 3 and shown in FIG. 4A to provide the set signal to the latch 52. The controller in FIG. 4A as applied to the switching power supply of FIG. 3 enforces input voltage matching and the nature of the circuit connection enforces output current matching. If one of the converters 34 has its voltage perturbed low, the control signals in the sensorless current mode controller of FIG. 4A are unaffected. Accordingly, the converter's output voltage will drop causing the reverse biasing of its output diode 44, thereby shutting off current. With reduced or zero load current, the respective input capacitor 38 recovers and matching is restored. The sensorless current mode control as exemplified in FIG. 4A provides a direct and simple way to keep the series-input parallel-output switching power supply of FIG. 3 stable, while the FIG. 3 configuration inherently shares current. The control of switching duty ratio by sensorless current mode makes it share input voltage in this connection. As the current sharing is enforced by energy storage constraints in the input filter, dynamic current sharing is supported as well.

Artisans will recognize the principles embodied in the embodiments discussed are more general than the particular circuits of the preferred embodiments. For example, any number of n>1 converters can be used. In addition, other step up and step down conversion ratios are possible in a single stage. Other types of switching converter circuits may be used as long as there is isolation between the input and output. Additional examples include push/pull, half bridge, or full bridge forward converters that could be used in place of the flyback converters 34 shown in FIG. 3. Another example is a complementary switching isolated converter.

Figure 5:
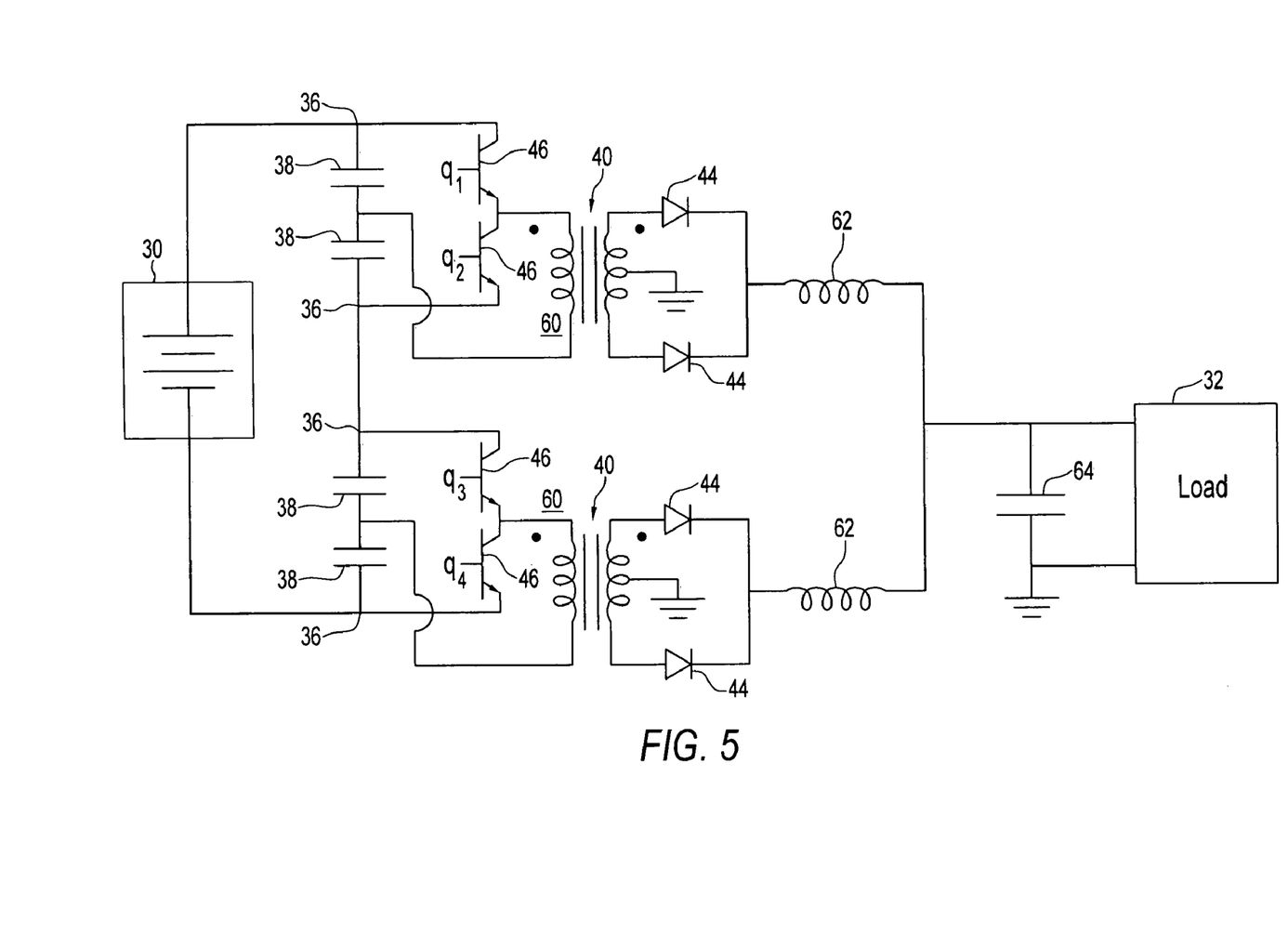
FIG. 5 illustrates an SIPO dc—dc switching power supply in accordance with another embodiment of the invention.
Figure 6:
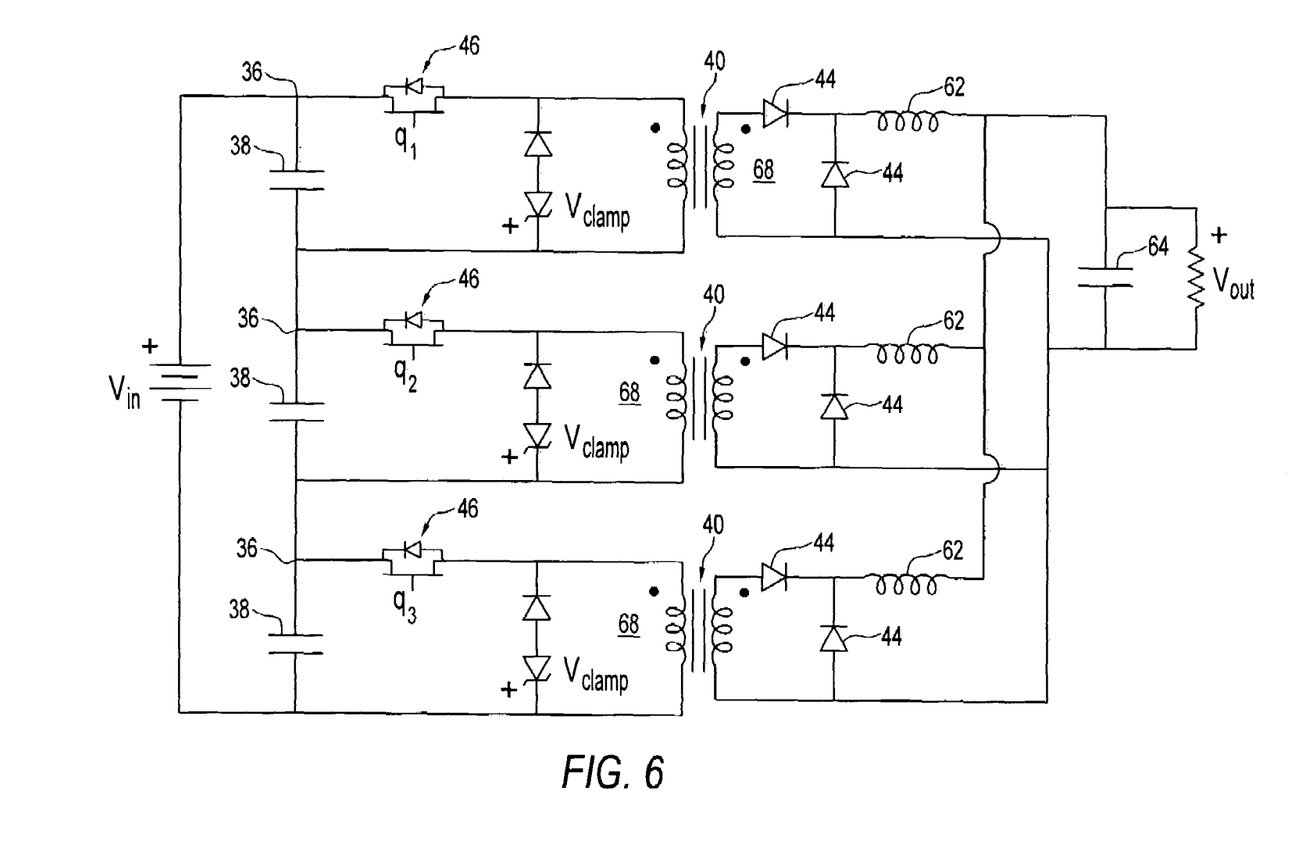
FIG. 6 illustrates an SIPO dc—dc switching power supply in accordance with another embodiment of the invention.

Without limiting the invention, some additional examples will be provided for purposes of illustration. FIG. 5 shows a series-input parallel-output push pull dc—dc switching power supply that includes multiple half bridge converters stacked for a series-input parallel-output configuration. Similar components of the switching power supply of FIG. 5 are labeled with reference numerals from FIG. 3. Half bridge converters 60 in the switching power supply of FIG. 5 share a magnetic coupling 40 in a fashion known in the art. Inductors 62 form output filters along with a capacitor 64 across the load 32. FIG. 6 shows another arrangement which is a series-input parallel-output clamp converter switching power supply. In the example of FIG. 6, there are three clamp converters 68 arranged with their inputs 36 in series and their output in parallel.

Figure 7:
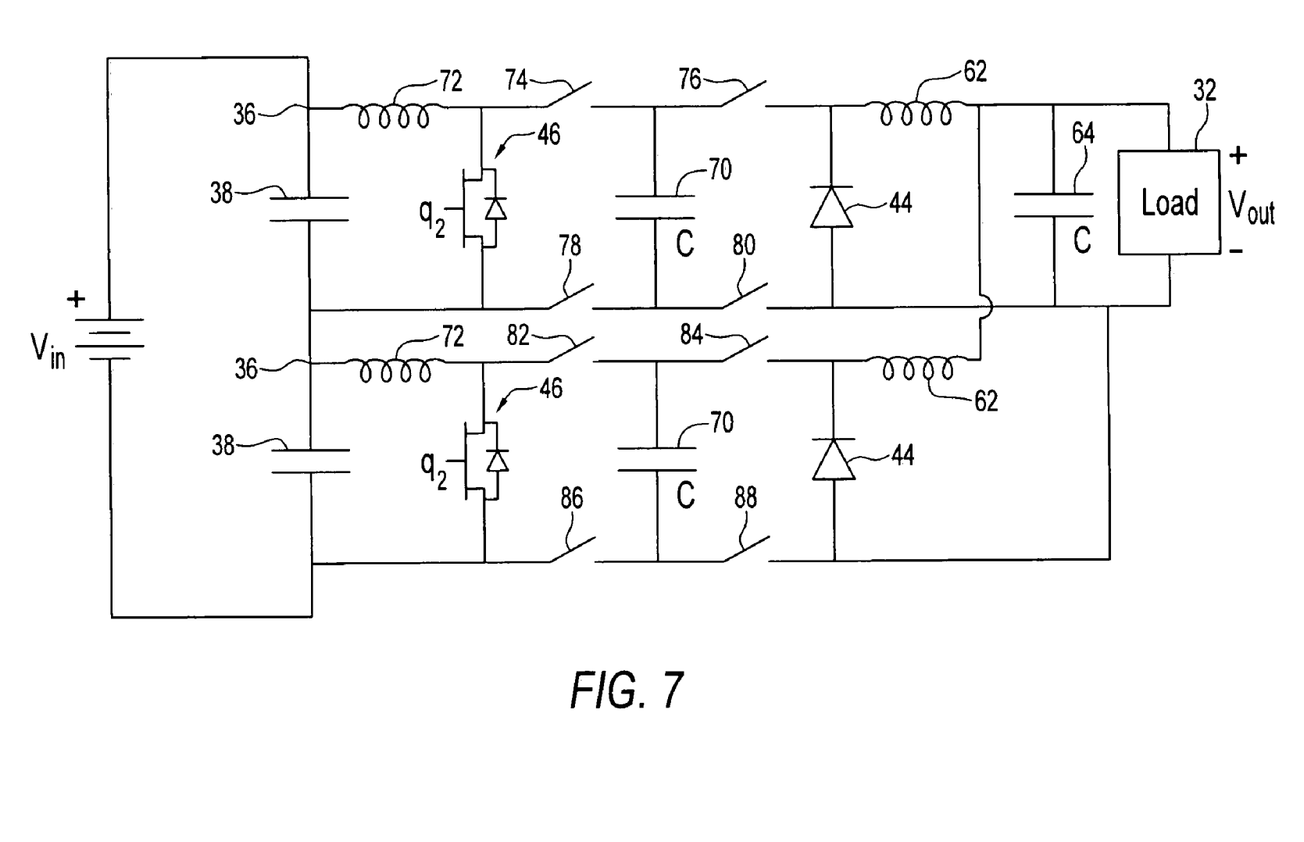
FIG. 7 illustrates an SIPO dc—dc switching power supply in accordance with another embodiment of the invention.

FIG. 7 shows another dc—dc switching power supply embodiment of the invention, using boost-buck circuits in a series-input parallel-output configuration and using complementary switch isolation instead of the magnetic isolation used in the above discussed embodiments. An additional capacitor 70 performs the function of energy transfer in this circuit. An additional inductor 72 ensures that the converter input has current source behavior. Isolation is achieved by isolation switches 74, 76, 78, 80, 82, 84, 86 and 88 that operate to isolate currents in the input side and the output side of the switching power supply from each other. Currents are isolated when the switches on opposite sides of the capacitor are not on simultaneously, e.g., when switch 74 is closed then switch 76 is open closed. In this manner, no direct electrical connection ever forms between the input and output, and the energy transfer is solely through the charging and discharging of the capacitor 70.

Switching functions for the isolation switches may be conveniently tied to the sensorless control mode switching signal $q_n$. In an example embodiment, switches are operated such that switching functions q74=q78, q76=q80, q82=q86, q84=q88. They operate such that q74 is the complement of $q_1$ and q82 is the complement of $q_2$. They also operate such that q74 and q76 are never on simultaneously and 82 and 84 are never on simultaneously. It is convenient, but not essential, to let q76 be complementary to q74 and q84 be complementary to q82. Typically they would operate in a phased manner, with $q_1$ and $q_2$ having the same duty ratio but separated in phase by 1/n of a cycle.

Figure 8:
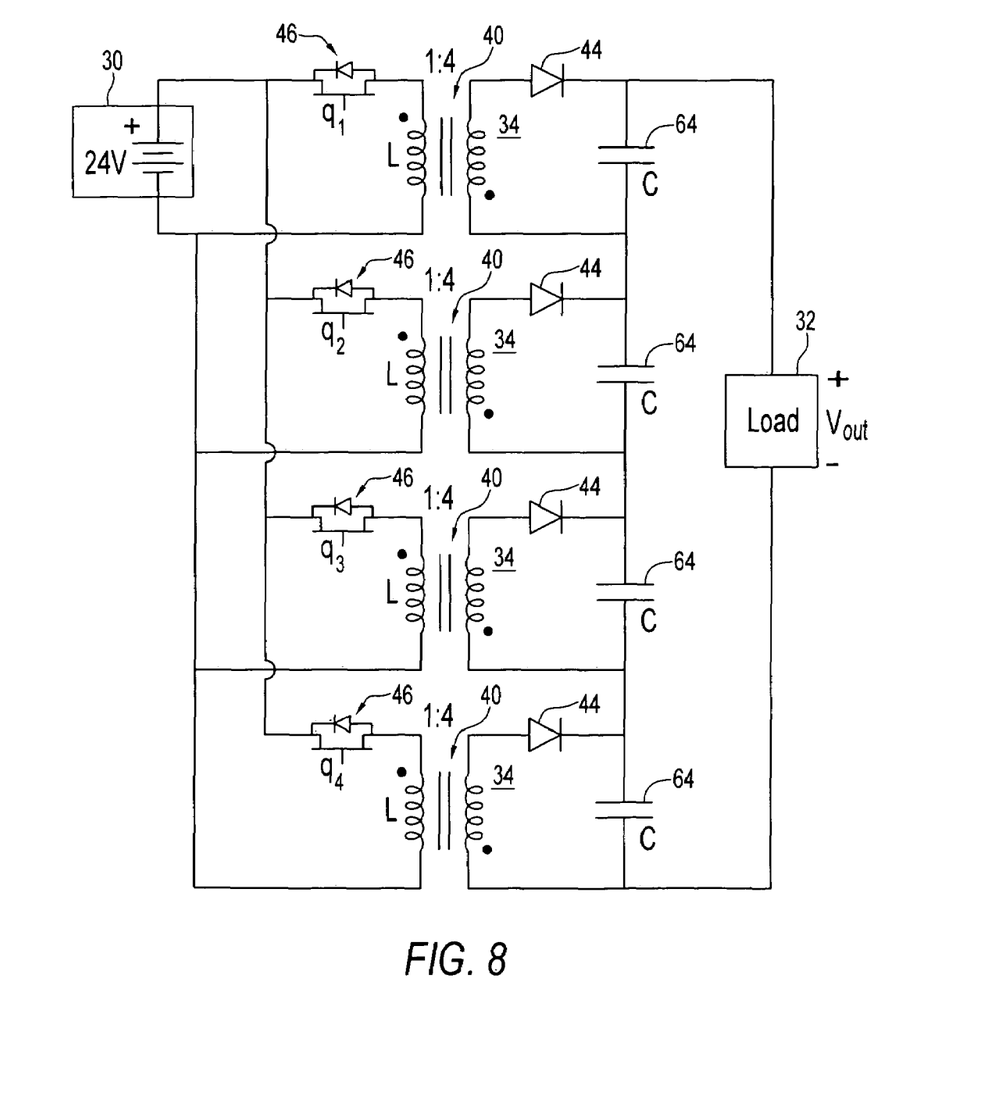
FIG. 8 illustrates an PISO (parallel-input series-output) dc—dc switching power supply in accordance with an embodiment of the invention.

The parallel-input series-output embodiment of any of the switching power supplies shown in FIGS. 3–7 is realized when the place of the power source and load are exchanged. The sensorless current mode control values in FIG. 4A are then changed to $V_{ref}/n$ and $V_{in}$. FIG. 8 shows an example parallel-input series-output flyback converter switching power supply, which is essentially the reverse configuration of FIG. 3. In the example of FIG. 8, a power source 30 is 24 volts and converters 34 step up the 24 volts to 400 volts.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A dc switching power supply, comprising:
a plurality of dc—dc switching power converters, each of said dc—dc switching power converters having its input isolated or switchably isolated from its output;
said dc—dc switching power converters being arranged with their respective inputs being series connected and their respective outputs being parallel connected;
an input filter in each of said dc—dc switching power converters;
an output filter in each of said dc—dc switching power converters;
a sensorless current mode control circuit in each of said dc—dc switching power converters controlling the switching duty ratio in each of said dc—dc switching power converters, each sensorless current mode control circuit using reference input and output voltages to control switching timing.

2. The power supply of claim 1, wherein said dc—dc switching power converters are substantially matched.

3. The power supply of claim 2, wherein each of said dc—dc switching power converters has a magnetic coupling from its input to its output to isolate its input from its output.

4. The power supply of claim 1, wherein each of said dc—dc switching power converters has a set of complementary switches to switchably isolate its input from its output.

5. The power supply of claim 1, wherein each of said dc—dc switching power converters has input and output diodes connected to switchably isolate its input from its output.

6. The power supply of claim 1, wherein said reference input voltage comprises an equal fraction of a total input voltage and said reference output voltage comprises an ideal output voltage.

7. The power supply of claim 6, wherein each of said sensorless current mode controllers accepts changes to the ideal output voltage.

8. The power supply of claim 7, further comprising an output voltage feedback controller that compares actual output voltage to the ideal output to determine a difference voltage and uses the difference voltage to correct the actual output voltage.

9. The power supply of claim 7, wherein the changes to the ideal output voltage are accepted from an external controller.

10. The power supply of claim 6, further comprising an output voltage feedback controller that compares actual output voltage to the ideal output to determine a difference voltage and uses the difference voltage to correct the actual output voltage.

11. The power supply of claim 1, wherein each of said dc—dc switching power converters has a step down magnetic coupling from its input to its output to isolate its input from its output and to step down a high input voltage to a low output voltage in a single stage.

12. The power supply of claim 11, wherein the low output voltage comprises a microprocessor supply voltage.

13. A computer device, comprising:
the power supply of claim 11;
a power source connection for the series-input of said plurality of dc—dc switching power converters; and
a microprocessor that is fed power from the parallel-output of said plurality of dc—dc switching power converters.

14. The power supply of claim 1, wherein each of said dc—dc switching power converters has a magnetic coupling from its input to its output to isolate its input from its output.

15. A dc switching power supply, comprising:
a plurality of dc—dc switching power converters, each of said dc—dc switching power converters having its input isolated or switchably isolated from its output;
said dc—dc switching power converters being arranged with their respective inputs being parallel connected and their respective outputs being series connected;
an input filter in each of said dc—dc switching power converters;
an output filter in each of said dc—dc switching power converters;
a sensorless current mode control circuit in each of said dc—dc switching power converters controlling the switching duty ratio in each of said dc—dc switching power converters, each sensorless current mode control circuit using reference input and output voltages to control switching timing.

16. The power supply of claim 15, wherein said dc—dc switching power converters are substantially matched.

17. The power supply of claim 16, wherein each of said dc—dc switching power converters has a magnetic coupling from its input to its output to isolate its input from its output.

18. The power supply of claim 15, wherein each of said dc—dc switching power converters has a set of complementary switches to switchably isolate its input from its output.

19. The power supply of claim 15, wherein each of said dc—dc switching power converters has input and output diodes connected to switchably isolate is input from its output.

20. The power supply of claim 15, wherein said reference input voltage comprises a total input voltage and said reference output voltage comprises an equal fraction of an ideal output voltage.

21. The power supply of claim 20, wherein each of said sensorless current mode controllers accepts changes to the ideal output voltage.

22. The power supply of claim 21, further comprising an output voltage feedback controller that compares actual output voltage to the ideal output to determine a difference voltage and uses the difference voltage to correct the actual output voltage.

23. The power supply of claim 21, wherein the changes to the ideal output voltage are accepted from an external controller.

24. The power supply of claim 20, further comprising an output voltage feedback controller that compares actual output voltage to the ideal output to determine a difference voltage and uses the difference voltage to correct the actual output voltage.

25. The power supply of claim 15, wherein each of said dc—dc switching power converters has a step up magnetic coupling from its input to its output to isolate its input from its output and to step up a low input voltage to a high output voltage in a singe stage.

26. The power supply of claim 25, wherein the low input voltage comprises a fuel cell supply voltage.

27. A power source, comprising:
the power supply of claim 26; and
a fuel cell to supply power to the series-input of said plurality of dc—dc switching power converters.

* * * * *